Patented May 7, 1929.

1,711,727

UNITED STATES PATENT OFFICE.

CHARLES N. FORREST, OF RAHWAY, NEW JERSEY, ASSIGNOR TO THE BARBER ASPHALT COMPANY, OF PHILADELPHIA, PENNSYLVANIA, A CORPORATION OF WEST VIRGINIA.

BITUMINOUS COMPOSITION AND METHOD OF PRODUCING THE SAME.

No Drawing.   Application filed August 6, 1924. Serial No. 730,386.

For paving purposes the compositions of my invention are intended for use for, either or both, the foundation and the wearing surface. As a wearing surface only, they are intended to be placed on a more or less rigid foundation such as hydraulic concrete, brick, stone-block or water bound macadam. In other words, my new method and the compositions which are the product thereof provides a bituminous mixture of sheet-asphalt, asphaltic-concrete, bituminous macadam or bituminous mastic types, which are suitable for the several uses enumerated above as well as any others for which the present types of hot bituminous mixtures, containing a mineral aggregate, are employed. When used as both foundation and wearing surface, my bituminous mixture will be supported directly by the soil sub-base, using a coarse aggregate mixture as foundation and a finer aggregate mixture for the wearing surface.

Hydraulic concrete has been used extensively as a foundation for the bituminous wearing surface of street pavements and, more recently, as the wearing surface as well as the foundation of roads and pavements. Such concrete is composed of broken stone, sand, hydraulic cement and water, all of which are conveniently mixed together in an unheated condition. Hydraulic concrete is hard and unyielding and many difficulties have developed in its use alone as a pavement. When newly placed it must be covered with earth or flooded with water for several weeks to prevent its drying out too rapidly. The cement in the mixture segregates to some extent and the upper surface is usually leaner in cement than is desirable, with the result that this surface scales and disintegrates to such an extent as to require frequent, if not constant, repairs. Concrete pavements also crack in cold weather to such an extent that expansion and contraction joints in it are provided in the first instance, and even so other cracks open in both new and old surfaces to such an extent that these must be filled with bitumen or other plastic material to prevent rapid disintegration at such points. The white surface of concrete roads reflect a maximum amount of both light and heat and has been found to be very disagreeable to the patrons of such roads on this account, whereas a dark colored surface is not subject to this disadvantage.

Asphalt and other bituminous pavements are composed of a bituminous cement, stone dust, sand and/or broken stone. The mixtures for such use are produced, largely, by heating separately the sand, stone and bituminous cement, combining these hot materials with unheated stone dust (filler) and then, while still hot, laying and compressing them over some suitable form of foundation (more or less rigid) as the wearing surface of a pavement.

Some types of bituminous pavements are produced by flooding the surface of unheated, broken stone, after this latter has been spread upon the roadway, with hot bituminous cement and then compressing all with a suitable roller.

Still other types of bituminous paving mixtures are produced by combining unheated stone with an emulsion of asphalt or a cut-back asphalt or pitch (a varnish containing a volatile solvent). These are used for repairing holes and ruts in old pavements and have their uses for such purposes as a matter of convenience, although they are too costly for general road building purposes on a large scale, and do not dry out quickly enough for practical purposes when used with sand or other fine aggregates.

Bituminous mastic and/or grout is produced by combining hot bituminous cement with hot mineral dust and hot sand, or for grout, hot bitumen with unheated but dry sand.

The bitumen, whether asphalt cement or coal tar cement, which has heretofore been used as a permanent binder for paving purposes has been prepared at a central point, usually an asphalt or oil refinery, by hot methods and transported to a local paving plant situated elsewhere, either in barrels or tank cars, where it is reheated and used hot in the preparation of paving mixtures.

I have discovered that bituminous mixtures suitable for the same uses as those prepared in a hot way, as described above, may be prepared directly at the location in which they are to be used as a pavement without heating or drying any of the raw materials employed and without the aid of heat in laying them in place, as conveniently and expeditiously as in preparing and laying hydraulic concrete. In practicing my invention I prefer to employ a mixing machine such as those used in preparing hydraulic concrete, thus banishing the costly plant and apparatus required in paving with hot bituminous mixtures.

Into the mixing chamber of a concrete mixer or equivalent machine I place a selected amount of broken stone and sand, or sand without stone if sheet asphalt or fine mixture is desired. I then add Portland or other hydraulic cement and fine mineral dust, or the cement alone. After dry mixing these materials together for a short time, as in making hydraulic concrete, and while the mixing operation is continued, I add sufficient water to produce a relatively dry concrete. While continuing the mixing I next add liquid flux, such as petroleum-oil, a non-volatile residuum flux or such other fluxing agent that has been tested with and found suitable for combining with and softening the powdered bitumen also to be used, and mix this thoroughly with the concrete. I then add and mix in as the final ingredient or matrix, powdered bitumen, such as gilsonite or coal-tar pitch. The cold flux and the cold, powdered bitumen are readily assimilated by the wet mortar. The mixture thus prepared may be placed at once on the road bed or foundation which is to receive the pavement and spread to a uniformly smooth surface by either hand or mechanically operated tools, as in placing hydraulic concrete.

If the bituminous surface is to be placed upon a new hydraulic concrete foundation, the mixture, prepared as just described, may be placed and tamped directly and immediately over the wet, green foundation and thus both of them will cure together during the several days that are usually allowed for green concrete to set.

I have discovered that in a mixture prepared as just described, the hydraulic cement having a great affinity for water will react within several hours, acting as a dehydrator, and thus absorb or permanently fix the water. Also the fluxing agent and the powdered bitumen will unite under atmospheric conditions of sun temperature, to form a bituminous cement of the same consistency and cementitious properties as if these two materials had been heated and thus combined or fluxed in advance of their use in the mixture. It is not possible to so conveniently and cheaply combine hot bituminous cements with wet concrete as it is to combine the flux and powdered bitumen, both cold, according to my method. I have not been able to mix hot bituminous cements with cold aggregates and to lay and make a bituminous pavement with such a mixture.

As a result of my method of combining the raw materials which I have enumerated above, the hydraulic cement and mineral aggregate are completely wetted with water before the bituminous materials are introduced. The introduction of the fluxing agent in sequence as described and the agitation of it with the wet cement, readily produces an emulsion, with the hydraulic cement acting as the emulsifying agent, in which the flux is the continuous phase. The flux is therefore present as a covering over the wet particles of the concrete and thus presents a favorable condition for the reception of the powdered bitumen,—which can not be mixed alone with the wet concrete, as these two substances are incompatible.

A very intimate mixture of all ingredients is thus produced and as there is a delay of several hours before the setting of the cement and water and before the solution of the powdered bitumen in its flux, ample time is afforded for manipulating the mixture in the mixing machine as well as on the road bed before it hardens too much for convenient handling. During this time, the water is absorbed and fixed by the cement, with formation of adhesions and agglomerates which tend to adapt themselves to the interstices of the sand and stone and thus increase the stability of the aggregate, for which however the bitumen ultimately becomes the essential cement or bond. This method of procedure produces an extremely dense (solid) composition by reason of the setting of the hydraulic cement in the voids of the sand or other mineral aggregate, while the presence of the elastic, bituminous cement reduces the brittleness of the same. After the composition has been laid and cured by the lapse of several days exposure to atmospheric conditions, its ultimate condition is that of a semi-plastic concrete, more rigid and stable than hot method bituminous paving composition heretofore known, but much less rigid and not possessing the structural strength of hydraulic concrete.

When this bituminous mixture is spread immediately over a green concrete foundation, this top course will flow into all of the surface irregularities of the foundation and thus unite most intimately with this latter. This prevents movement of the bituminous wearing surface on the foundation and thus prevents waving and rutting of the surface, two very common and serious defects in hot mixed bituminous pavements.

This placing of the top course or surface covering on the green foundation also prevents rapid drying out of the hydraulic concrete foundation and thus obviates the necessity of covering this latter with earth or water, as well as the cost and inconvenience of the use of these expedients, which are now common practice.

The inorganic materials which I employ are the usual broken stone, sand, mineral dust and hydraulic cement of commerce. Plaster of Paris or other material having hydraulic properties similar to Portland cement may be used in lieu of this latter. But the low cost and availability of cement at this time renders it the preferred substance of this class for the purpose described.

As fluxing agent I employ a liquid petroleum product of non-volatile character which will flow freely enough at atmospheric temperatures to be handled conveniently without heating. A considerable range in consistency is permissible, and other than convenience there are no limitations as to this. A very thick flux may be handled and mixed with the wet concrete if it (the flux) is warmed sufficiently to make it flow. I employ any of the various petroleum fluxes which are used in hot asphalt paving methods, provided they will dissolve the powdered asphalt in the cold and, similarly, I use any variety of creosote or tar oil which will dissolve powdered pitch in the cold.

By non-volatile fluxing agent I mean a product from which has been removed gasolene, benzole or any of the other liquid substances occurring in petroleum or tar, which are customarily taken off by distillation as solvents or light oils.

As asphalt or pitch I employ bitumens of these classes which may be finely powdered and which will not coalesce during shipment and the usual handling operations. Gilsonite is a preferred type of asphaltic bitumen for my purpose, as it occurs native as a pure, hard substance which powders readily, will stay powdered, and may be contained and transported in paper sacks as in handling cement or hydrated lime. Grahamite and impsonite are somewhat similar to gilsonite in this respect. Petroleum asphalt and the native lake asphalts are usually too soft to be powdered or to retain their powdered form, but these classes of asphalt if hard enough to be powdered and otherwise of suitable character for the purpose are to be considered within the scope of my invention.

Target pitch from oven or gas house tar, when sufficiently hard to be powdered and handled as such, may be used in my composition for purposes for which tar products are suitable.

I do not depart widely in the proportions of coarse and fine aggregate or in bituminous cement for my composition from those of hot paving methods except in one respect, viz the addition of an hydraulic cement as a dehydrator for my wet composition.

Any finely powdered mineral or insoluble organic substance functions as a filler in hot bituminous mixtures and has a slight preferential affinity for the bituminous cement. I may also employ a finely powdered inert filler in my cold method; but if this is used, I also employ hydraulic cement specifically as a dehydrator and stabilizer, and merely take, incidentally, what benefit there may be from that portion of it which also functions as a filler because it happens to remain in a finely powdered as well as an hydrated condition in my ultimate composition.

The proportion of flux to powdered bitumen will vary with the character of both of these raw materials. But little attention is now paid in the bituminous paving industry to the actual proportions of such raw materials, as the consistency of the cement which results from the combination of them, the union of a softer flux with a harder bitumen, is ascertained and regulated by penetration as per American Society for Testing Materials standard method for Determining the Consistency of Bituminous Binders D-5-21. As so regulated, I use such proportions of flux and powdered bitumen as, in a preliminary test, when melted together, will show a penetration by the above method of between 5 and 250,—the exact consistency within these limits depending upon the type of pavement to be laid, or the other use to which the material is expected to be put.

The amount of combined flux and powdered bitumen matrix (bituminous cement) in my composition will also necessarily vary according to the size and shape of the particles of the mineral aggregate thereof. This variation is also in accordance with hot paving methods and will fall between 2% or 3% by weight for open coarse stone mixtures, to as much as 20% for very fine no-stone aggregates.

Good results have been obtained when the usual 1:3:5, 1:2:6, and other conventional concrete proportions, such as are used for concrete roads or road foundations, have been employed. Into such mixtures as these a suitable amount of flux and powdered asphalt is introduced separately and in sequence, as previously described, in the presence of water. But the basis of my composition is usually a bituminous, Portland cement mortar of the following proportions:—

| | Per cent. | |
|---|---|---|
| Sand | 62 | Per cent. |
| Portland cement | 13 | Water ___ 15 to 20 |
| Limestone dust | 13 | |
| Petroleum flux | 6 | |
| Powdered gilsonite | 6 | |

Any kind of hard and tough, fine or coarse, one size or graded, stone may be combined with the above mortar in various proportions, as may be dictated by the desire for an open or a closed paving mixture, as the case may be. Without any stone the above mixture or mortar is of the conventional sheet asphalt type in general appearances.

Having thus described my invention, I claim:

1. A bituminous concrete of the character described comprising mineral aggregate with hydraulic and bituminous cements; the hydraulic cement uniting only the finer mineral particles, and the resultant agglomerates and the rest of the aggregate being bonded into a semi-plastic concrete by a unifying matrix of bituminous cement.

2. The method which comprises mixing cold mineral aggregate with cold flux and powdered bitumen in the presence of hydraulic cement and water.

3. The method of making a bituminous composition of the character described which comprises mixing and emulsifying fluxing oil with fresh hydraulic mortar, and then before the mortar has set adding powdered bitumen adapted to be fluxed by the oil.

4. An aqueous bituminous mortar of the character described comprising mineral aggregate, powdered bitumen, water, a flux for the bitumen emulsified with the water, and a dehydrator adapted to gradually release the water from the emulsion.

5. An aqueous bituminous mortar of the character described, comprising mineral aggregate, powdered bitumen, and hydraulic cement, together with oil emulsified with the water of the mortar, and adapted to flux the bitumen.

6. The method which comprises mixing cold mineral aggregate with cold flux and powdered asphalt in the presence of hydraulic cement and water.

7. The method of producing a bituminous composition which consists in mixing together aggregate, hydraulic cement and water, adding a fluxing oil to the mixture and effecting the formation of an oil external phase emulsion of the water and oil, then admixing powdered bitumen with the emulsion formed and permitting the bitumen to become fluxed with the oil.

8. The method of producing a bituminous composition which consists in adding fluxing oil to freshly made hydraulic mortar, producing an emulsion of the water of the mortar and the oil, with the cement as the emulsifier; admixing bitumen in powdered form with the fluxing oil after the production of the emulsion, the cement being present in such quantity and functioning so as to absorb the water from the emulsion and the oil and bitumen being present in such quantity that the bitumen is fluxed with the oil and forms the binding element of the composition.

9. The method of producing a bituminous composition which consists in mixing together an aggregate, water and a fluxing oil in the presence of an emulsifying agent having the capacity to absorb water from the emulsion of water and oil formed, and admixing powdered bitumen with the emulsion before the emulsion is broken down through the absorption of water therefrom by the emulsifier.

10. The method of making a bituminous composition which consists in mixing in the cold aggregate, a fluxing oil and bitumen in the presence of hydraulic cement and water, whereby the water is emulsified with the fluxing oil with the formation of an oil external phase emulsion and thereby the bitumen becomes fluxed with the oil for the formation of a bituminous bond for the aggregate on the absorption of the water from the emulsion by the cement.

11. The method of making a bituminous pavement without the aid of artificial heat, which consists in mixing together a mineral aggregate, hydraulic cement and water, then adding to the mixture a fluxing oil and emulsifying the water and fluxing oil, then adding to the mixture powdered bitumen and finally spreading and compacting the mixture upon a foundation before the hydration of the cement.

12. The method of making a bituminous pavement without the use of heat which includes mixing a mineral aggregate, water, a flux, bitumen and a dehydrator having the capacity for promoting emulsification of the water and flux, emulsifying the water and flux to form an emulsion with the flux in external phase and spreading and compacting the same upon its foundation before the dehydrator has absorbed the water from the emulsion formed.

13. The method of producing a bituminous cement which includes forming an emulsion with water and a fluxing agent for bitumen with the latter in external phase, and admixing a powdered asphalt with the emulsion.

14. The method of producing a bituminous composition which includes forming an emulsion of water and a fluxing agent for bitumen with the latter in external phase, in the presence of hydraulic cement, admixing powdered bitumen with the emulsion formed, permitting the bitumen to become fluxed with the fluxing agent and permitting the water to be absorbed from the emulsion by the cement.

In testimony whereof, I have hereunto signed my name at Philadelphia, Pennsylvania, this 30th day of July, 1924.

CHARLES N. FORREST.